(12) United States Patent
Husney (10) Patent No.: US 8,612,575 B2
(45) Date of Patent: Dec. 17, 2013

(54) SYSTEM AND METHOD FOR OBJECT ABSTRACTION AND LOGGING

(75) Inventor: Jordan Husney, Minneapolis, MN (US)

(73) Assignee: Digi International Inc., Minnetonka, MN (US)

( * ) Notice: Subject to any disclaimer, the term of this patent is extended or adjusted under 35 U.S.C. 154(b) by 370 days.

(21) Appl. No.: 12/592,533

(22) Filed: Nov. 25, 2009

(65) Prior Publication Data

US 2011/0125886 A1     May 26, 2011

(51) Int. Cl.
*G06F 15/173* (2006.01)
(52) U.S. Cl.
USPC .......................................... 709/224; 709/221
(58) Field of Classification Search
None
See application file for complete search history.

(56) References Cited

U.S. PATENT DOCUMENTS

| 6,108,782 | A * | 8/2000 | Fletcher et al. | 713/153 |
| 2005/0071506 | A1* | 3/2005 | Hettish | 709/245 |
| 2010/0241748 | A1* | 9/2010 | Ansari et al. | 709/225 |

* cited by examiner

*Primary Examiner* — Mohamed Ibrahim
(74) *Attorney, Agent, or Firm* — Fogg & Powers LLC (57) ABSTRACT

A system and method of communicating with a plurality of different types of devices. A device driver is defined for each type of device. The device driver creates and maintains a set of channels for each device; each channel represents a property of the device. Newly acquired data received from one of the devices is received at the device driver and published to the channel associated with the data. Publishing the newly acquired data to the channel associated with the data includes storing the newly acquired data in a channel database with a time stamp corresponding to the time the data was received. Control information for one of the devices is received at the device driver and associated with one of the channels. The control information is passed to the device being controlled.

21 Claims, 6 Drawing Sheets

SYSTEM AND METHOD FOR OBJECT ABSTRACTION AND LOGGING

BACKGROUND OF THE INVENTION

1. Field of the Invention

The present invention is related to data processing, and more particularly to object abstraction and logging.

2. Background Information

There is a desire to connect an enormous variety of objects to a network for monitoring and control. This includes objects which have never been, or rarely have been connected to networks before, e.g., animals, plants, and stationary or mobile assets such as equipment and vehicles.

To date, approaches for combining disparate objects into an information system have been limited. In one approach, a system interface is defined and, as long as the objects being measured meet the predefined criteria, the system can present their measurements. For example, a heart-rate, soil moisture level, or vehicular speed may all be presented as varying voltage levels and presented using a fixed representation. Such systems have limited flexibility and little or no capability for transforming or combining data from multiple sources in order to create new data. For example, a device may not have general-purpose extensibility to combine "voltage" and "current" samples in order to compute a new "power" sample, log it, and transmit it across a network. Often, such processing has to be relegated to another system.

A second approach is to a Supervisory Control and Data Acquisition (SCADA) system. SCADA systems typically are usually built around a Programmable Logic Controller (PLC). As such, they also may be limited in their flexibility.

A third approach is to build a purpose-built data acquisition and data presentation system. Such systems can be expensive to build and maintain, and it is difficult to adapt a purpose-built system to new problems.

An extensible system and methodology is needed in order to provide for the connectivity, control, data transformation, logging, and presentation for this diverse set of objects. Further complicating the problem is that connectivity is needed from objects to embedded computing devices—with limited processing and storage capabilities. The system and methodology must be applicable equally to modest embedded computing devices as well as more capable general computing platforms.

What is needed is a system and method for object abstraction that addresses these issues and other issues that will become apparent while reading the following specification.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

As noted above, there is a desire to connect an enormous variety of objects to a network for monitoring and control. This includes objects which have never been, or rarely have been connected to networks before, e.g., animals, plants, and stationary or mobile assets such as equipment and vehicles.

Figure 1:
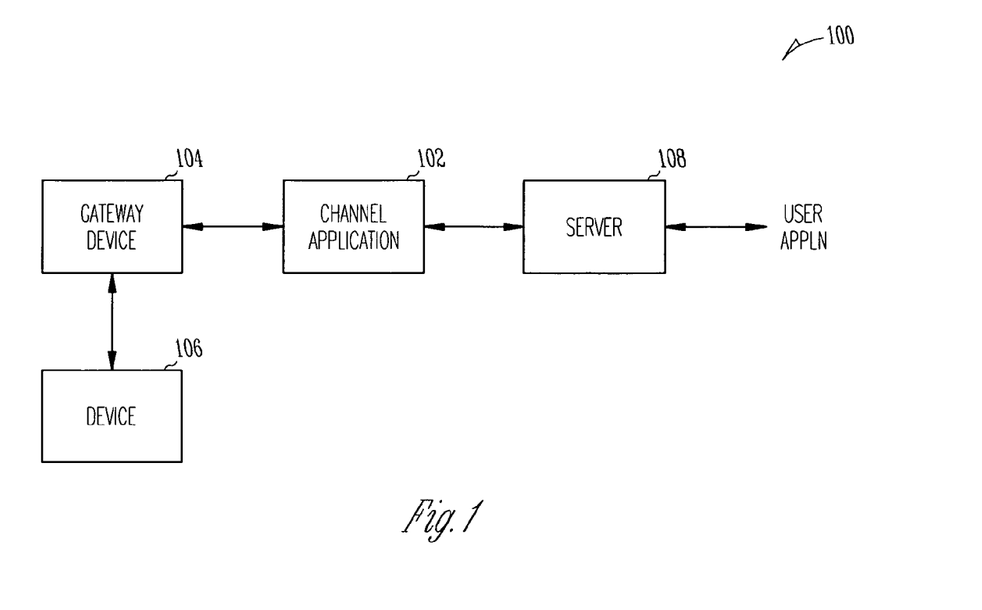
FIG. 1 illustrates a channel-based system.

A system 100 for communicating with a variety of devices is shown in FIG. 1. In system 100 of FIG. 1, a channel application 102 is connected to a gateway device 104. Gateway device 104 is connected in turn to one or more devices 106. In one embodiment, gateway device 104 is a device such as the ConnectPort® gateway manufactured by Digi International.

In one embodiment, devices 106 communicate with gateway device 104 using standard protocols such as ZigBee, 802.15.4, serial communications or Modbus. In one such embodiment, software executing on channel application 102 intelligently commissions devices 106 and collects data from devices 106 into named "channels." In one embodiment, the system and method are adapted to be applicable to everything from modest embedded computing devices to more capable general computing platforms.

In one embodiment, channel application 102 and gateway device 104 operate together to provide connectivity, control, data transformation, logging, and presentation for a diverse set of objects. To accomplish this, in one embodiment, channel application 102 uses an abstraction approach to characterize devices 106. System 100 uses this abstraction in order to build a flexible general purpose data logging and network presentation solution.

The system of abstraction relies on the following principle: every object—physical and virtual—can be described as having a set of properties which may be known as channels. For example, a simplified global positioning system object may have "latitude" and "longitude" channels. A patch of earth may have "soil moisture," "pH," and "nitrogen concentration," channels. A vehicle may have the channels, "speed," "throttle position," "fuel level," "tire pressure," etc. Each channel is an attribute or property of a device 106.

In one embodiment, a pre-defined set of functions can be performed on each channel property. In one such embodiment, there are three methods which may be performed on a channel. These are "set," "get," and "refresh." The "set" method sets an output to a new value. The "get" method retrieves last known value for the channel. The "refresh" method requests that the channel be updated before it might otherwise do so in its normal state.

In one embodiment, this methodology for organizing devices 106 into "channels" results in a novel, practical network-attached data logging and control solution.

Figure 2:
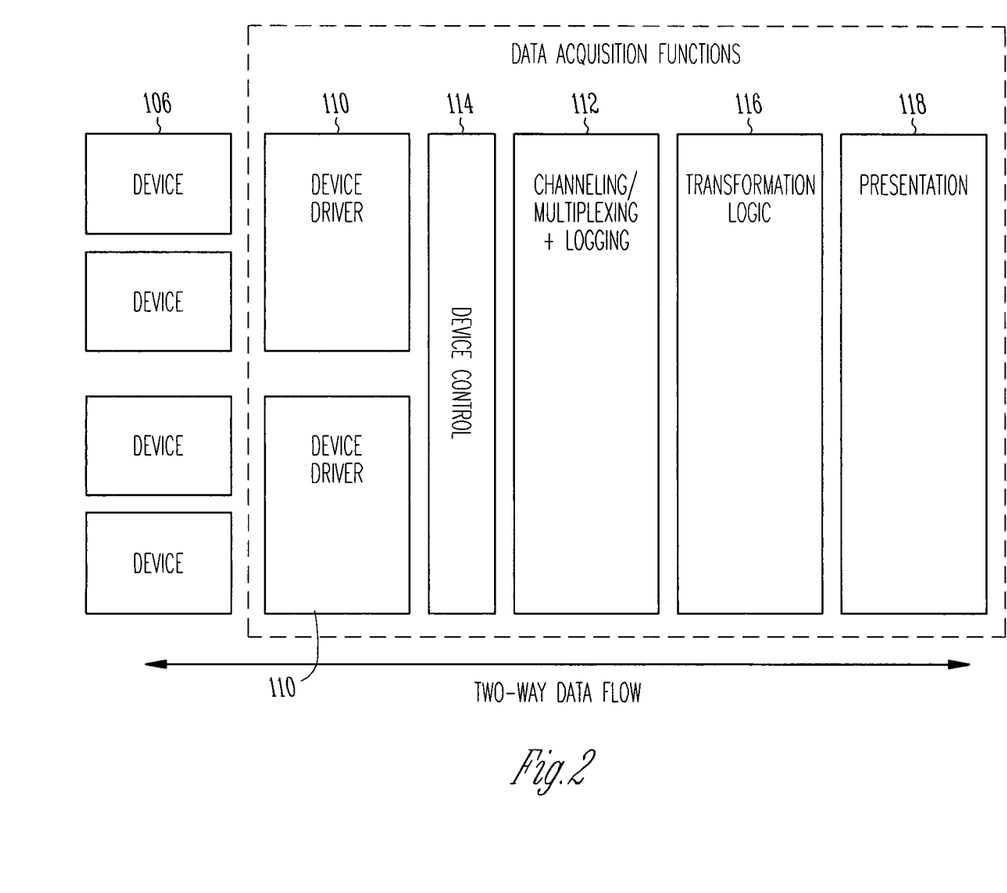
FIG. 2 illustrates data acquisition in the system of FIG. 1.

First, data is produced by abstract entities known as "device drivers." Some representative device drivers 110 are shown in FIG. 2. Each device driver 110 is responsible creating and maintaining a set of channels. Drivers operate via channels: they publish newly acquired data to channels and they receive new control events from channels. If an operation requires a unit of information, that unit of information is known as a "sample" object.

Drivers 110 publish sets of samples into their channels, where they are logged at 112. Control passes back through device control 114. Data logged at 112 can be manipulated at 116 and presented at 118.

The channel-oriented nature of the invention allows for the abstraction of objects for the purposes of data acquisition and control. Abstracting complex objects into simple channels updating a single aggregated state (i.e., the "channel database") allows for flexible temporal logging and presentation of data and permits significant leveraging of code re-use.

In one embodiment, configuration data for application 102 is stored in a configuration file. When the application is started, it configures itself from the configuration file and processes data from both physical and logical channels.

Figure 3:
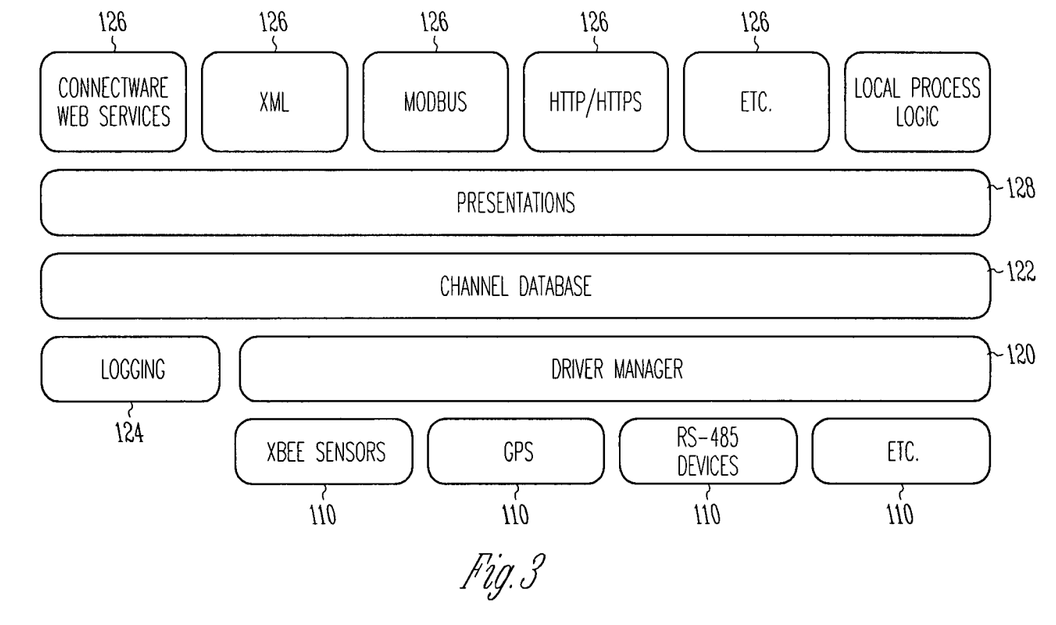
FIG. 3 illustrates aspects of a channel application.

Another representation of system 100 is shown in FIG. 3. In the embodiment shown in FIG. 3, drivers publish sets of samples into their channels. The sets of samples are passed to device manager 120. From there they are passed to channel database 122 and to channel log 124.

Channel database 122 represents the currently known state of all channels for all device drivers. New channel events manipulate the state of channel database 122. Before the state transition is available to the remainder of the system the channel operation is recorded by the channel log 124.

New channel events include new samples, new channels, and channel removal indications. In one embodiment, these channel operations are recorded to a "channel log" journal. Journal replay on a copy of the channel database 122 is used to access historical information enabling the user to recreate and inspect the state of the system at any moment of time for all devices abstractions represented in the system.

Special classes of device drivers known as presentation drivers 126 are responsible for "presenting" the channel information to humans or to other machines. Their special property is that they produce no channels, they only interact with the live channel database 122 or a journaled historical copy of channel database 122 in order to display or exchange information. In the embodiment shown in FIG. 3, the presentation drivers communicate with channel database 122 through presentations interface 128.

Representing current state information is exactly the same as representing historical information due to the method of organizing channels into a channel database. As such, presentation modules 126 can leverage a maximum of code reuse for both current and historical state representation.

Returning to FIG. 1, in one embodiment, channel information stored in the channel database is read by a server 108 and passed on to one or more user applications. In one such embodiment, server 108 maintains connections to devices by using a server-to-device management protocol. In one embodiment, server 108 also caches data and configuration, handles server requests from users and propagates those requests to device interfaces 104 and channel devices 102.

In one embodiment, presentation information associated with each channel is stored in channel application 102.

In one embodiment, server 108 includes web services. In one such embodiment, server 108 operates in the cloud; user applications communicate to the server cloud via web service and have full access to device configuration and device data by sending specific requests to targets in system 100.

Figure 4:
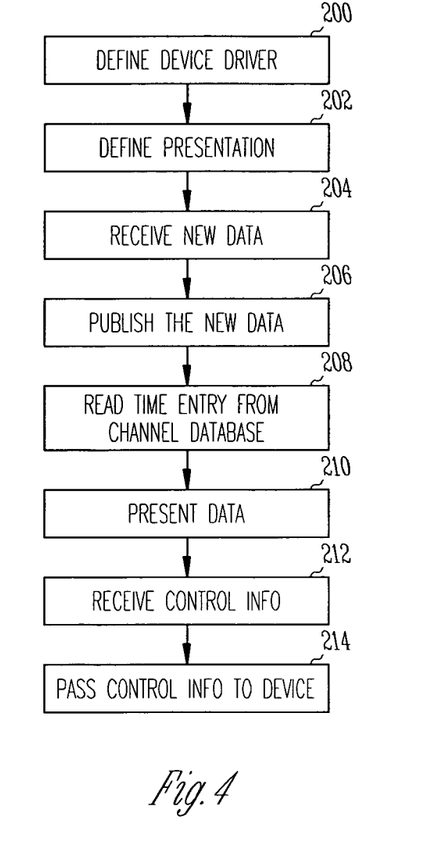
FIG. 4 illustrates a method for communicating with a plurality of different types of devices.

What we have described is a system and method for communicating with a plurality of different types of devices. As can be seen in FIG. 4, a device driver is defined at 200 for each type of device, wherein the device driver creates and maintains a set of channels for each device, wherein each channel represents a property of the device. Newly acquired data received at 204 from one of the devices by the device driver associated with the device is published at 206 to the channel associated with the data, wherein publishing the newly acquired data to the channel associated with the data includes storing the newly acquired data in a channel database with a time stamp corresponding to the time the data was received.

In one embodiment, a data presentation is defined at 202 for each channel. In one such embodiment, data associated with one or more channels is read at 210 from the channel database and presented, based on its data presentation, for analysis.

In one embodiment, control information for one of the channels is received at the device driver at 212 and the control information is passed to its associated device at 214.

In one embodiment, storing the newly acquired in a channel database includes making a time entry in the channel database each time newly acquired data is published to the channel database, wherein each time entry includes the time stamp corresponding to the time the data was received and a current state for each channel.

In one embodiment, time entries associated with previous channel states are read and presented to a user via its associated data presentation so the user can how the channel state changed over a period of time.

In one embodiment, defining a data presentation for each channel includes selecting a presentation method from one or more predefined presentation methods.

In one embodiment, defining a device driver for each type of device includes selecting a device driver from one or more predefined device drivers.

Figure 5:
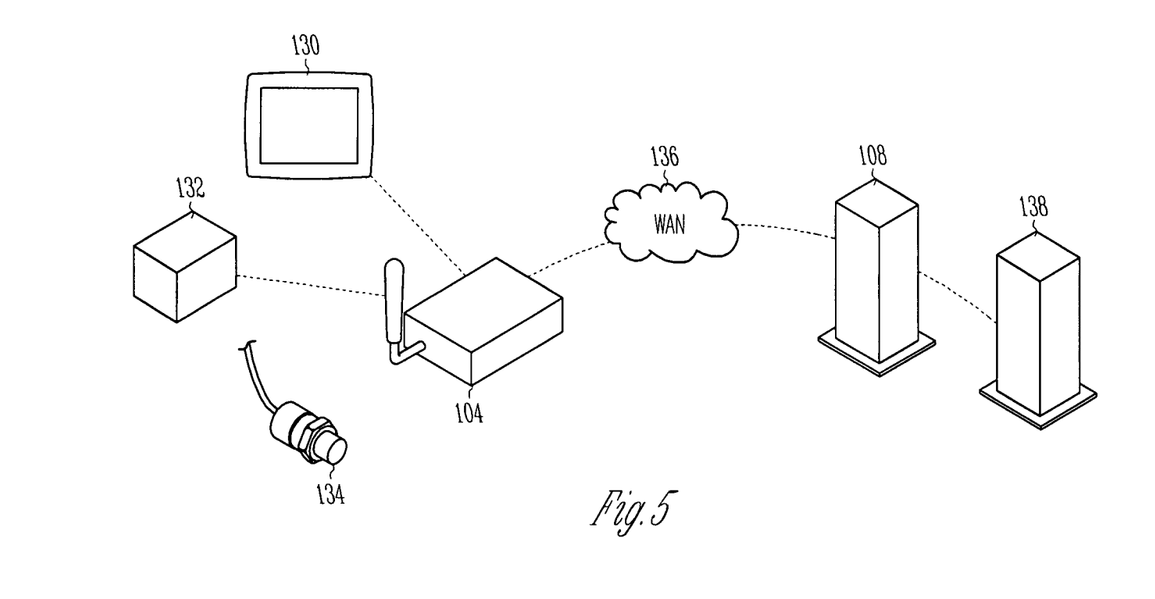
FIGS. 5 and 6 illustrate examples of web-based data acquisition and control.

An example of system 100 is shown in FIG. 5. In FIG. 5, system 100 includes a gateway device 104 connected to a thermostat 130, a programmable logic controller (PLC) 132 and a sensor 134. In the embodiment shown, channel application 102 executes within a processor of gateway device 104, where it logs data read from devices 130, 132 and 134, transmit control information to devices 130, 132 and 134 and presents the data read from devices 130, 132 and 134 to a server 108 over a wide area network 136. User applications 138 operate on the data presented by application 102.

Figure 6:
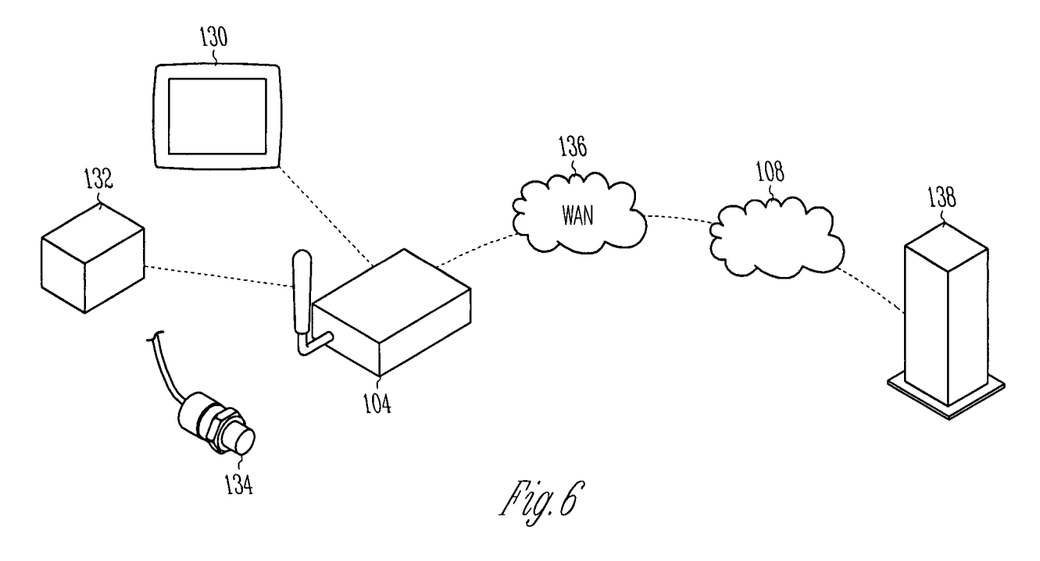

Another example of system 100 is shown in FIG. 6. In FIG. 6, system 100 includes a gateway device 104 connected to a thermostat 130, a programmable logic controller (PLC) 132 and a sensor 134. In the embodiment shown, channel application 102 executes within a processor of gateway device 104, where it logs data read from devices 130, 132 and 134, transmit control information to devices 130, 132 and 134 and presents the data read from devices 130, 132 and 134 to a server 108 over a wide area network 136. User applications 138 operate on the data presented by application 102.

In the example shown in FIG. 6, server 108 manages the remotes devices 130, 132 and 134 while user applications 138 gather data via industry standards-based web services.

In the embodiments shown in FIGS. 5 and 6 above, channel application 102 is software running on gateway device 104. In one such embodiment, application 102 is written in Python and includes logic which can be used to facilitate decision-making during data acquisition and presentation. For example, sensors might measure current into and voltage across an electrical device. Application 102 can calculate total power used by the device as a calculation based on the current into and the voltage across the device over time. Power used can be presented as a logical channel alongside of, or instead of, the physical channels of current in and voltage across. Such transformations can be used to introduce business, network or other rules to determine how data is used and shared.

For instance, a trucking company might equip its fleet with GPS receivers and fuel gauge sensors. The GPS receivers have two attributes "latitude" and "longitude" while the fuel tank sensor has the attribute "fill level." Application 102 is configured to treat the truck as a device with the device properties "latitude", "longitude" and "fill level." Each truck property has an associated channel in the channel database. That is, each time that one of the attributes delivers a current state, an entry for device "truck" is made in the channel database. The entry includes a time stamp, and a value for each of the properties associated with truck.

In one embodiment, the current state of each property of each device "truck" in the fleet is saved (i.e., logged) as a time entry whenever a current state is saved for any one truck property. This channel database may be transmitted across a wide area network such as the Internet and stored on a centralized server. Therefore, if any channel in the universe of trucks is updated, the state of the universe is recorded in the server's database.

Once you have built a centralized database for all trucks, you can query the latest entry for a given truck from the database to determine where the truck is and what its fuel level is. You can also query its past entries to determine where it has been, or its fuel efficiency. In fact, a running average fuel efficiency could be calculated by application 102 and stored as a logical channel associated with "truck."

One could also place more sophisticated algorithms in application 102. For instance, a user application 138 may receive a pickup location ready to receive a truck for a package pickup. Application 102 would represent the state of a truck running on a gateway 104 in the truck. User application 138 receives the channel information from the truck and communicates with the truck via server 108. In one embodiment, user application 138 analyses the data received from the truck and determines the trucks that are closest to the pickup location and whether they have the fuel capacity to make the pickup. In some embodiments, the trucking company may have multiple applications 102, each running on a separate gateway device 104. In some such embodiments, server 108 aggregates the channel data received from each application 102, or passed the channel data to user application 138 for aggregation and analysis.

What has been described above is an extensible framework for remote data acquisition, control, and presentation of device data on device gateways such as the ConnectPort® gateways. The system is capable of collecting data from any device which can communicate with a gateway, over any gateway interface, and presents this data to upstream applications in a fully customizable way.

None of the past approaches define "samples" and "channels" to abstract a wide set of physical or virtual objects. In addition, none of these approaches have a central channel-oriented state that may be represented as discreet state changes written to a journaled channel log. In addition, none of the approaches are able to present current and historical information using the same presentation logic.

The advantages of this approach are the following:
System allows for easy abstraction of a wide variety of tangible and virtual objects into channels.
Channels may be used for data acquisition (monitoring) and control operation.
Channel operations can be abstracted into a set of simple operators (e.g., get( ) set( ) and refresh( ))
The state of the system is the sum-total of all channels organized into a structure known as a channel database.
A channel log allows for any state in time to be reproduced by playing the log backward or forward.
Code for presenting information to humans or other machines may be reused to present the current state or historical state information due to the channel database/channel log methodology.

Finally, as noted above, the channel-oriented nature of the invention allows for the abstraction of objects for the purposes of data acquisition and control. Abstracting complex objects into simple channels updating a single aggregated state (the "channel database") allows for flexible temporal logging and presentation of data, including a significant leveraging of code re-use.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of communicating with a plurality of different types of devices, comprising:
defining a device driver for each type of device, wherein the device driver creates and maintains a set of channels for each device, wherein each channel represents a property of the device;
defining a data presentation for each channel;
receiving, at the device driver, newly acquired data received from one of the devices;
publishing the newly acquired data to the channel associated with the data, wherein publishing the newly acquired data to the channel associated with the data includes storing the newly acquired data in a channel database with a time stamp corresponding to the time the data was received;
reading, from the channel database, data associated with one or more channels;
presenting, based on its data presentation, one or more channels for analysis;
receiving, at the device driver and from one of the channels, control information for one of the devices; and
passing the control information to the device being controlled.

2. The method of claim 1, wherein storing includes making a time entry in the channel database each time newly acquired data is published to the channel database, wherein each time entry includes the time stamp corresponding to the time the data was received and a current state for each channel.

3. The method of claim 2, wherein reading from the channel database includes accessing time entries other than the latest time entry and wherein presenting one or more channels includes presenting channel state as channel state changes over a period of time.

4. The method of claim 1, wherein defining a data presentation for each channel includes selecting a presentation method from one or more predefined presentation methods.

5. The method of claim 1, wherein defining a device driver for each type of device includes selecting a device driver from one or more predefined device drivers.

6. The method of claim 1, wherein the set of channels for a first device of the plurality of different types of devices includes a logical channel, wherein publishing includes determining data for the logical channel as a function of one or more other channels associated with the first device and storing the logical channel data with the data for the other channels associated with the first device in the channel database.

7. A method of logging data from a plurality of different types of devices, comprising:
defining a device driver for each type of device, wherein the device driver creates and maintains a set of channels for each device, wherein each channel represents a property of the device;
defining a data presentation for each channel;
receiving, at the device driver, newly acquired data received from one of the devices;

publishing the newly acquired data to the channel associated with the data, wherein publishing the newly acquired data to the channel associated with the data includes storing the newly acquired data in a channel database with a time stamp corresponding to the time the data was received;

reading, from the channel database, data associated with one or more channels; and presenting, based on its data presentation, one or more channels for analysis, wherein presenting includes displaying the data as it changes over time such that one can scroll forward and back in time to watch the data change.

8. The method of claim 7, wherein storing includes making a time entry in the channel database each time newly acquired data is published to the channel database, wherein each time entry includes the time stamp corresponding to the time the data was received and a current state for each channel.

9. The method of claim 8, wherein reading from the channel database includes accessing time entries other than the latest time entry and wherein presenting one or more channels includes presenting channel state as channel state changes over a period of time.

10. The method of claim 7, wherein defining a data presentation for each channel includes selecting a presentation method from one or more predefined presentation methods.

11. The method of claim 7, wherein defining a device driver for each type of device includes selecting a device driver from one or more predefined device drivers.

12. The method of claim 7, wherein the set of channels for a first device of the plurality of different types of devices includes a logical channel, wherein publishing includes determining data for the logical channel as a function of one or more other channels associated with the first device and storing the logical channel data with the data for the other channels associated with the first device in the channel database.

13. A method of communicating with a plurality of devices, wherein the plurality of devices includes devices of different types, the method comprising:

creating an abstraction for each type of device, wherein creating an abstraction includes selecting two or more device properties to track for each device;

assigning a channel set to each device, wherein each channel set includes two or more channels, wherein each selected device property for a device is assigned to a channel in the channel set for that device;

defining a device driver for each type of device;

receiving, at the device driver, newly acquired data received from one of the devices;

determining the channel associated with the newly acquired data and publishing the newly acquired data to that channel;

receiving, at the device driver and from one of the channels, control information for one of the devices; and passing the control information to the device being controlled;

wherein publishing the newly acquired data includes storing the newly acquired data in a channel database with a time stamp corresponding to the time the data was received.

14. The method of claim 13, wherein storing includes making a time entry in the channel database each time newly acquired data is published to the channel database, wherein each time entry includes the time stamp corresponding to the time the data was received and a current state for each channel.

15. The method of claim 14, wherein the set of channels for a first device of the plurality of different types of devices includes a logical channel, wherein publishing includes determining data for the logical channel as a function of one or more other channels associated with the first device and storing the logical channel data with the data for the other channels associated with the first device in the channel database.

16. The method of claim 13, wherein defining a device driver for each type of device includes selecting a device driver from one or more predefined device drivers.

17. A method of communicating with a plurality of different types of devices, comprising:

defining a device driver for each type of device, wherein the device driver creates and maintains a set of channels for each device, wherein each channel represents a property of the device;

receiving, at the device driver, newly acquired data received from one of the devices;

publishing the newly acquired data to the channel associated with the data;

receiving, at the device driver and from one of the channels, control information for one of the devices; and passing the control information to the device being controlled;

wherein publishing the newly acquired data to the channel associated with the data includes storing the newly acquired data in a channel database with a time stamp corresponding to the time the data was received.

18. The method of claim 17, wherein storing includes making a time entry in the channel database each time newly acquired data is published to the channel database, wherein each time entry includes the time stamp corresponding to the time the data was received and current state for each channel.

19. The method of claim 17, wherein defining a device driver for each type of device includes selecting a device driver from one or more predefined device drivers.

20. The method of claim 17, wherein the set of channels for a first device of the plurality of different types of devices includes a logical channel, wherein publishing includes determining data for the logical channel as a function of one or more other channels associated with the first device and storing the logical channel data with the data for the other channels associated with the first device in the channel database.

21. The method of claim 17, wherein the method further comprises making a time entry in the channel database each time new control information for a device is published to a channel in the channel database, wherein each time entry includes the time stamp corresponding to the time the control information was received and a current state for each channel of that device, including the channel associated with the control information.

* * * * *